United States Patent [19]
Rowan et al.

[11] Patent Number: 6,067,202
[45] Date of Patent: *May 23, 2000

[54] METHOD AND APPARATUS FOR CONTROLLING SPINDLE MOTOR COMMUTATION SWITCHING TIMES IN A DISK DRIVE

[75] Inventors: Bryan Scott Rowan; Mantle Man-Hon Yu, both of San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/769,039

[22] Filed: Dec. 18, 1996

[51] Int. Cl.$^7$ .............................. G11B 15/46; G11B 5/09; H02K 23/00; H01R 39/46
[52] U.S. Cl. .......................... 360/73.03; 360/48; 360/51; 318/254; 318/439
[58] Field of Search .................................. 360/51, 73.01, 360/73.03, 71, 72.1, 52, 48; 318/254, 439, 568

[56] References Cited

U.S. PATENT DOCUMENTS

| | | | |
|---|---|---|---|
| 4,392,095 | 7/1983 | Ruxton | 318/254 |
| 4,415,844 | 11/1983 | Mendenhall et al. | 318/254 |
| 4,622,499 | 11/1986 | Squires et al. | 318/254 |
| 4,639,798 | 1/1987 | Harrison et al. | 360/73 |
| 4,876,491 | 10/1989 | Squires et al. | 318/138 |
| 4,979,055 | 12/1990 | Squires et al. | 360/69 |
| 4,979,056 | 12/1990 | Squires et al. | 360/69 |
| 5,038,232 | 8/1991 | Grace | 360/73.03 |
| 5,210,660 | 5/1993 | Hetzler et al. | 360/51 |
| 5,317,241 | 5/1994 | Hans | 318/254 |
| 5,448,428 | 9/1995 | Even et al. | 360/73.03 |

FOREIGN PATENT DOCUMENTS

| | | | |
|---|---|---|---|
| 57-162977 | 3/1981 | Japan | G11B 19/28 |
| 56-37865 | 4/1981 | Japan | G11B 19/28 |
| 58-171766 | 10/1983 | Japan | G11B 19/20 |
| 2-41695 | 2/1990 | Japan | G11B 19/28 |
| 7-141780 | 6/1995 | Japan | G11B 20/10 |

OTHER PUBLICATIONS

IBM TDB Article, vol. 32., No. 5B, Oct. 1989, "Phase Error Detect Logic for Disk File Speed Control".

*Primary Examiner*—Aristotelis M. Psitos
*Assistant Examiner*—Regina Y. Neal
*Attorney, Agent, or Firm*—Altera Law Group, LLC

[57] ABSTRACT

A method and apparatus for controlling a spindle motor having at least one winding in a storage device are proposed, the storage device having at least one data storage medium rotatably supported by the spindle motor and having a plurality of tracks on each surface thereof including data regions and nondata regions, and a transducer assembly for selectively positioning a transducer over each data storage surface of the storage medium for reading and writing of information stored on the medium. The method and apparatus control rotation of the spindle motor by providing a voltage waveform to each winding at selected switching times during each rotation such that switching does not occur while the head is positioned over data. In a first embodiment, switching during nondata regions is assured by setting the switch points to coincide in time with a fixed data storage surface format. Alternatively, the data storage surface is written with servo sectors to coincide in time with preselected switch points. In a third embodiment, the time for switching is advanced or delayed until the transducer is located over a nondata region near to the nominal switching point by providing a processor executing control code and a delay circuit for delaying switching from a zero-crossing in the spindle motor control circuit. Optional enhancements are also presented.

59 Claims, 8 Drawing Sheets

METHOD AND APPARATUS FOR CONTROLLING SPINDLE MOTOR COMMUTATION SWITCHING TIMES IN A DISK DRIVE

BACKGROUND OF THE INVENTION

1. Technical Field

The present invention relates generally to high reliability storage and retrieval of data in a storage device having a spindle motor and more particularly to a method and apparatus for assuring that data read and write operations do not coincide with commutation of the spindle motor poles for enhanced data readback reliability.

2. Description of the Background Art

Magnetic disk drives utilized for the storage of information are well-known. Data is stored in the form of magnetic transitions created on the surfaces of one or more magnetically coated storage disks stacked vertically on a rotatable spindle motor assembly. The data is organized into a plurality of annular rings or tracks having a desired track format. The specific format of a data track depends upon the particular design of the disk drive system, but will invariably include a number of non-user-data fields. Data is stored and retrieved on a disk surface using a head assembly, movement of the assembly relative to the storage medium being controlled by a servo system.

One or more disks are mounted to a spindle motor through a rotatable hub. Today's disk drives predominantly use brushless DC spindle-motors having a fixed number of poles and windings. A commutation voltage waveform must be applied to each winding in a specific sequence to cause rotation of a desired speed and direction. The timing of the switches is preferably optimized to reduce power consumption. An example of a brushless DC spindle motor is provided in *DC Motors Speed Controls Servo Systems: An Engineering Handbook,* 5th Ed., August, 1980, Chapter 6, published by Electro-Craft Corporation. 1600 Second Street South, Hopkins, Minn. 55343. Switching of the pole commutation currents according to the predefined sequence is controlled by a spindle motor controller.

Switching points will frequently coincide with read and/or write operations. Unfortunately, switching of the commutation voltages produces noise spikes which may interfere with the channel and the read/write transducers, adversely impacting data reliability.

One approach for avoiding noise during data transfers is disclosed in Unexamined Japanese Patent Publication No. 58-171766, wherein the data surfaces of a storage device are formatted such that each switching point corresponds to a gap in one of the data fields. Thus switching only occurs when a gap is passing beneath the active head. This method requires a same, fixed number of data sectors per track, the number of sectors being a multiple of the number of switches required to commutate the motor, to assure that a gap will coincide with current switching. But data sectors today typically do not include gaps of sufficient length to accommodate commutation switching. Moreover, data is no longer recorded at a fixed frequency, instead being recorded in bands of different data frequencies for increased data capacity. Consequently, each band will have a different number of data sectors per track. In addition, the formats of data sectors in disk drives employing sectored servo architectures will also vary, some of the sectors of a track being interrupted or "split" by servo information. This means that the placement of gaps will also vary. Finally, today's disk drives skew the information recorded on one disk surface relative to the next adjacent surface for performance reasons. The Japanese reference does not account for such skewing in spindle motor commutation.

What is needed, therefore, is a method and apparatus for use in today's disk drive designs for controlling spindle motor current switching such that switching does not occur during a read or write operation, particularly in disk drives implementing banded recording, sector skewing, and other storage disk formats having irregularly placed nondata fields.

SUMMARY OF THE INVENTION

Accordingly, the present invention provides a method and apparatus for use in a disk drive having any of a variety of disk drive formats including banded data, split data fields, and/or sector skewing, whereby the switching points of the spindle motor commutation sequence are controlled to assure that they do not occur while the read/write transducer is positioned over a data field during a read or write operation.

In a first embodiment of the invention, a correspondence between current switching and nondata regions is established without the need for additional delay circuitry either by formatting the disk such that nondata fields are placed to coincide in time with predefined switch points, or alternatively, by setting the switch points to coincide with preexisting nondata fields on the disks.

In a second embodiment, the nominal switching points are preset, but are advanced or delayed during normal disk drive operation to coincide with preexisting nondata regions on the disk which have been mapped and stored in memory. This latter approach is implemented by adding a timing control function to the spindle motor system and has the following basic steps. First, prior to each switching point a determination is made of the distance to the nearest nondata field relative to the track location corresponding to the nominal switching point, and an appropriate delay is selected to advance or delay switching from the nominal switching time so that the transducer is over the nearest nondata field during switching. Switching is then advanced or delayed to occur at the selected time. In a sector servo disk drive, switching may be advanced or delayed to coincide with the nearest servo sector, for example.

Optional enhancements to the basic procedure are possible. For example, one may first check if the transducer will be positioned over a nondata field when switching is imminent, so that advancing or delaying to another nondata field is avoided when switching points naturally coincide with nondata fields. For banded data or other formats in which the track compositions differ across the disk, each unique track format is mapped in memory. The current track or band number is then determined, and the appropriate track format is retrieved from memory prior to selecting an appropriate switching time. Another modification to the basic method is to only advance or delay switching when a data read or write operation is in progress, since switching will not adversely affect disk drive operation if data is not being transferred. In another enhancement, the method is adapted for sector skewing by modifying the timing control functions to provide a delay to account for sector skewing when switching from one transducer to another.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 9; is a block diagram of the timing delay function to be added to the spindle motor control system in accordance with the present invention;

DETAILED DESCRIPTION OF THE PREFERRED EMBODIMENT

Figure 1:
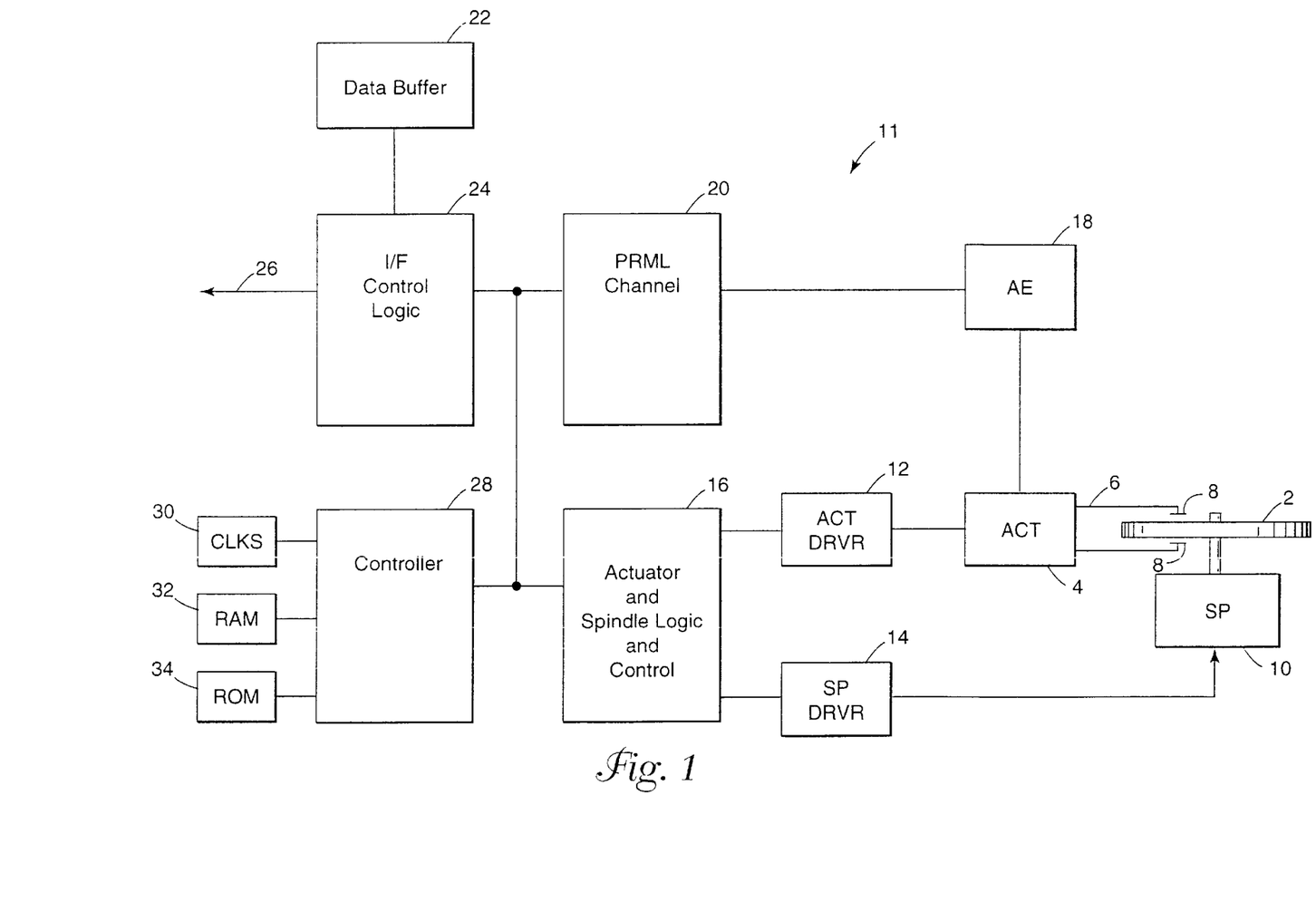
FIG. 1 is a functional block diagram of a disk drive suitable for practicing the present invention.

FIG. 1 is a block diagram representing the functional blocks of a disk drive suitable for practicing the present invention. It shall be understood that the disk drive shown is for illustration purposes only and that numerous disk drive designs may be adapted for the proposed sync byte detection scheme. The disk drive system 11 of FIG. 1 stores information on the surfaces of one or more rotatably mounted storage disks 2 in the form of magnetic transitions or patterns formed on a plurality of annular data tracks. The disks are rotatably mounted to a spindle motor 10. Commutation currents for driving and maintaining a relatively constant speed of rotation of the spindle motor are provided by a spindle motor driving circuit 14 under the control of spindle motor control logic 16. The spindle motor will be discussed in more detail subsequently.

Magnetic transitions are sensed or "read" from disk 2 via one or more transducers or read heads 8 which are supported in close proximity to the rotating disk surfaces. For high track densities, magnetoresistive (MR) read heads are desirable because of their high degree of sensitivity. Each head is electrically coupled to arm electronics (AE) module 18 including a preamplifier, which in turn is coupled to a data channel 20 preferably of the PRML type. The channel includes, among other things, an automatic gain control circuit (AGC), a variable frequency oscillator (VFO) circuit, and sync byte detection circuitry. Descriptions of PRML channels are provided in commonly assigned U.S. Pat. Nos. 5,220,466 and 5,255,131.

The heads 8 are mounted to a linear or rotary actuator assembly 4 for selective positioning of the heads over desired tracks. The actuator assembly 4 preferably comprises a voice coil motor (VCM) responsive to a control current provided by an actuator driver 12. Actuator control logic 16 controls the precise positioning of the head during execution of track seek and track following operations by regulating the control voltage of driver 12. Predominantly, such positioning is accomplished using closed loop servo control, which utilizes feedback information from the disk to find and maintain a position over a target track. This feedback information may be located on a single, dedicated disk surface (i.e., dedicated servo) or embedded on data tracks between portions of data (embedded servo). The actuator control electronics 16 may be combined with the spindle motor control logic 16 as shown in FIG. 1, and may comprise, for example, an integrated chip including a Texas Instruments digital signal processor (TMS320) and any other necessary support logic and microcode.

Write data from a host device (not shown) must be received on line 26 in a format recognizable to the disk drive 11. Similarly, data transfers to the host must be provided in a form recognizable to the requesting device. Interface control logic 24 is therefore provided to manage this interfacing function. Functions of the interface control logic include 1) management of data transfers between the data channel 20 and a data buffer 22; and 2) management of data transfers between the data buffer 22 and the host according to an expected data transfer protocol. These combined functions are available, for example, in the Western Digital WD61C96 integrated SCSI package. Alternatively, a disk controller, interface, and buffer manager are available for performing these functions in a variety of chip sets commercially available for SCSI interface protocols, as well as other interface protocols, e.g., serial storage architecture (SSA), fibre channel, peripheral component interconnect (PCI) and Personal Computer Memory Card International Association (PCMCIA).

Master control over the various functions of the disk drive is typically overseen today by a controller 28 embedded within the disk drive electronics. The controller 28, preferably the commercially available AMD 80C186 by Advanced Micro Devices Corp., comprises a microprocessor and may also include support logic (e.g., counters, an interrupt controller, a direct memory access (DMA) controller, a serial interface controller, and other functions generally known to assist microprocessor control functions). The controller is normally associated with a predetermined amount of read-only-type memory (ROM) 34 for storing a control program, RAM 32, and a reference clock 30. The controller 28 directly oversees operation of the interface control logic 24, the data channel 20, and actuator and spindle control circuit 16.

Figure 2:
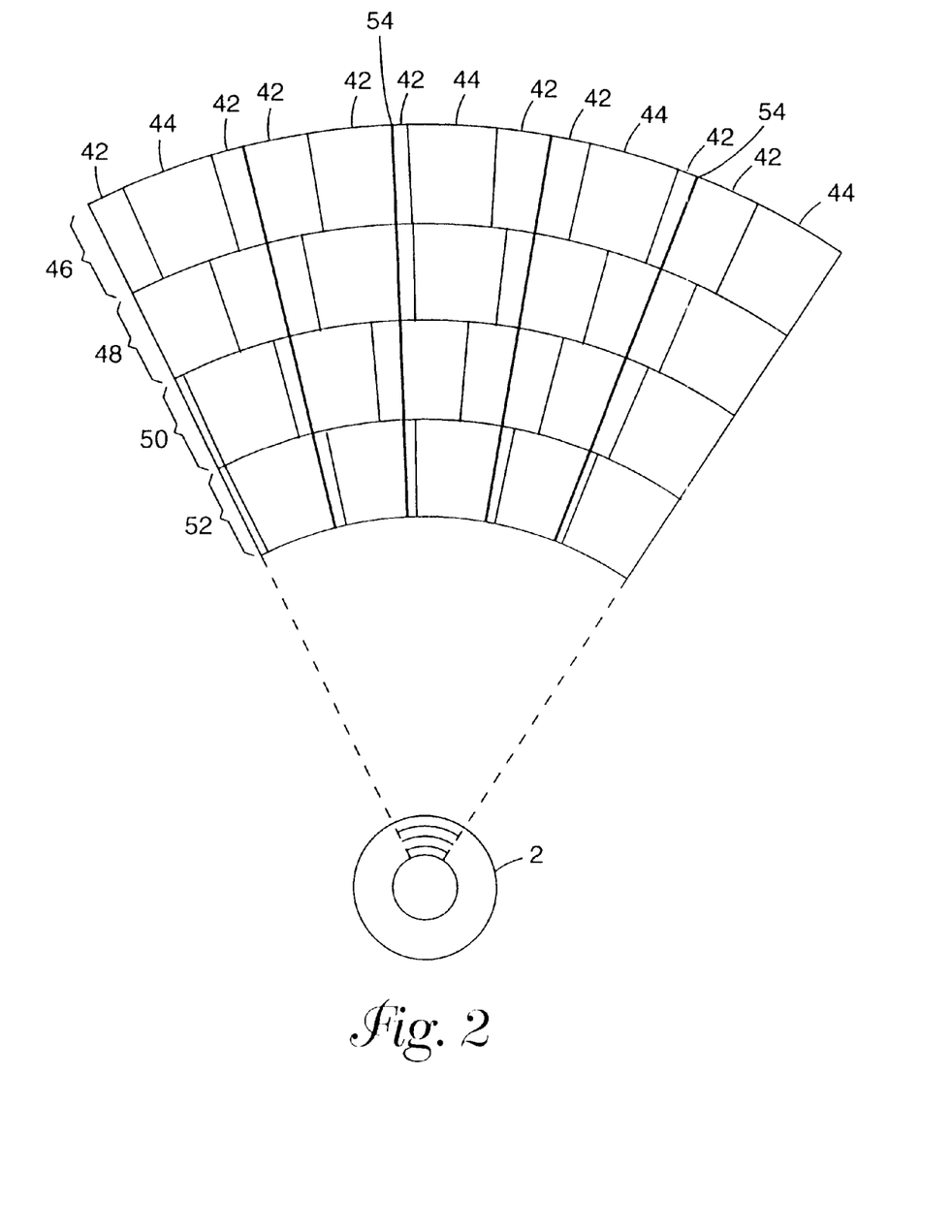
FIG. 2 illustrates a sectored servo disk format having split data fields and banded data tracks.

Data is recorded on the surfaces of storage disks 2 according to a predefined format. FIG. 2 is a portion of a disk surface formatted according to the preferred disk format for practicing the present invention. It shall be understood, however, that one feature of the invention is its adaptability to numerous other types of formats. Referring to FIG. 2, servo sectors 54 are recorded radially at regularly spaced locations around the disk surface according to a sectored servo architecture. (A detailed description a sectored servo architecture is provided in U.S. Pat. No. 5,210,660, which is incorporated herein by reference). The disk surface is further subdivided into a plurality of data bands or zones, 46, 48, 50, 52, each comprising a plurality of data tracks. Four bands are shown for convenience. The data recording frequency within each band remains constant, but increases from band to band moving from the inner diameter (ID) to the outer diameter (OD) of the disk to maximize track bit densities.

Data is preferably recorded in blocks or sectors, each having a fixed length and a predetermined circumferential location within its respective zone or band. Since the ratio of data sectors to servo sectors changes from band to band, at least some of the data sectors may be "split" into subblocks by the interspersed servo sectors 54. In FIG. 2, full data blocks are designated by numeral 44, and data subblocks are designated by numeral 42. For purposes of the present invention, the term "data block" shall henceforth refer to both continuous data sectors and to subblocks of split data sectors.

Figure 3A:
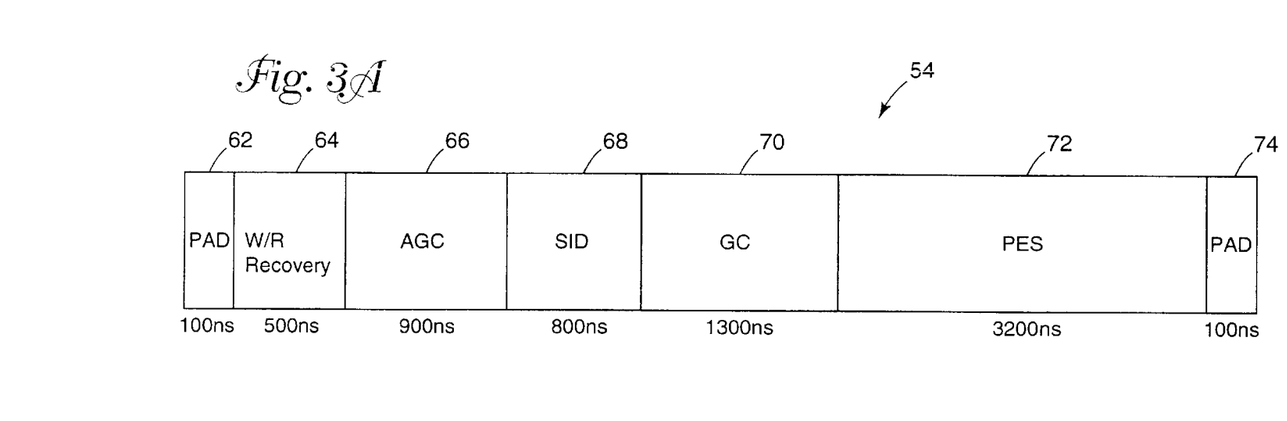
FIG. 3A represents a servo field.

The servo sectors preferably include three types of information: a sector mark or other identifier signaling the start of the servo sector information, coarse radial position information such as a grey code or track identifier, and fine radial track alignment information. FIG. 3A provides an example of a specific servo sector format suitable for practicing the present invention. It includes a PAD field 62, a write-to-read recovery field 64, an AGC field 66, a sector identifier (ID) field 68, a grey code field or track identifier (ID) field 70, a position error signal field 72, and a second PAD field 74. The times shown indicate the duration of each field passing beneath the transducer 8, assuming a rotational speed of 7200 RPM. The PAD fields 62 and 74 are provided as a buffer zone for variations in spindle speed to assure that the servo information is not accidentally overwritten. The write-to-read recovery field 64 provides the time required for switching the channel from write mode to read mode in preparation for reading of the servo information. In the preferred embodiment, this field is has a duration of 1 microsecond. The AGC field 66 contains a repeating pattern for producing a corresponding repetitive electrical signal of the same amplitude, frequency and phase as the servo information to be read. This repeating signal is used by the AGC circuit in the data channel to adjust a variable gain amplifier (VGA) and thereby to amplify the read signal to a predetermined normalized level. It is also used by the VFO circuit for tuning the variable frequency oscillator, e.g., a voltage controlled oscillator (VCO), to match the frequency and phase of the signal. Thus the AGC field must be long enough to accommodate the actual amplitude, frequency and phase adjustment operations. Determination of the appropriate length or number of bytes is made by studying the response of a particular disk drive configuration. In the preferred embodiment, a length corresponding to a duration of 1 microsecond under the transducer was found to be sufficient.

The sector ID field 68 comprises a timing mark, such as a dibit, indicative of the beginning of the servo information. The timing mark may be used by the servo detection logic to determine the circumferential position of the head, e.g., by counting from a zero reference point (e.g., detection of an index mark) the number of sector marks passing beneath the read head 8. The grey code or track ID field 70 preferably includes information for uniquely identifying a track. In the preferred embodiment, this field comprises a cylinder number and a head number. The PES field 72 preferably comprises radial quadrature burst patterns that are used to generate a position error signal indicative of transducer or head alignment with respect to the centerline of a track. Quadrature burst positioning systems are used widely in the art. The position error signal produced from the burst patterns provide information to the actuator control electronics 16 for correcting the head alignment in a track following mode.

Figure 3B:
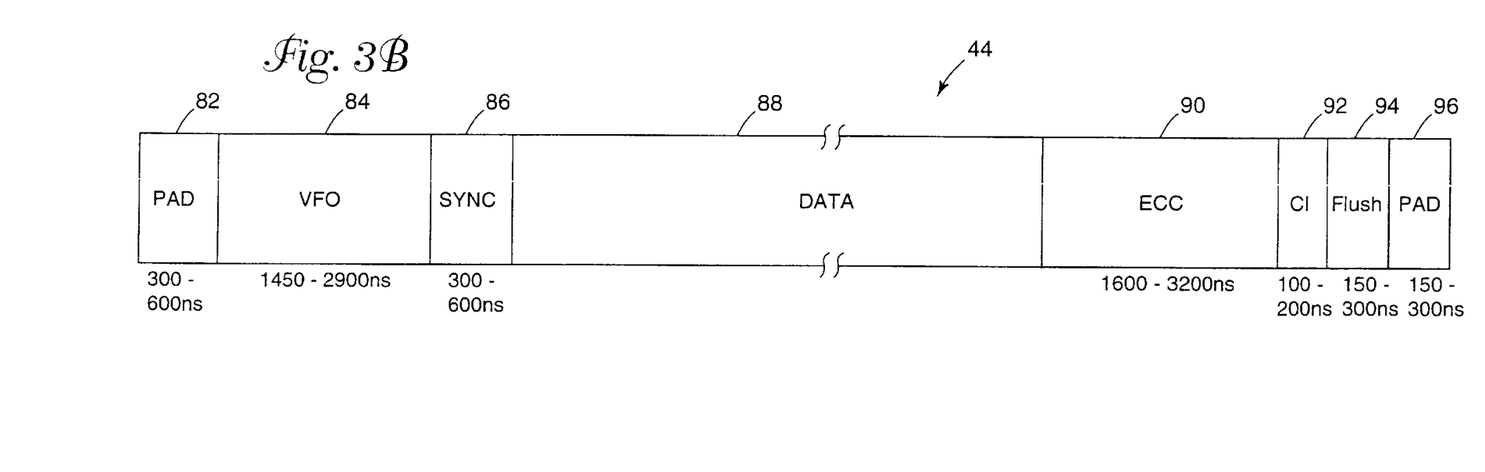
FIG. 3B represents a data field.

The data blocks comprise user information, as well as timing information for use by the read channel to synchronize to the data to be read. FIG. 3B is a representation of a data block format suitable for implementing the present invention. The block has a headerless or "NoID" (TM) format, meaning that the conventional ID field, which contains information to uniquely identify the data field and defect/spare information has been eliminated for increased data capacity. It shall be understood, however, that the present invention may also be implemented in storage devices with alternative data block formats that may or may not include ID fields. The data block is representative of both the continuous data blocks 44 and the split blocks 42 of FIG. 2.

Data is typically written to the tracks of a disk drive in splices, rather than as a continuous data stream. Moreover, portions of the track data may be modified. As a result, the timings of the respective data splices are not synchronous and each splice must be preceded by information for time-locking the readback electronics to that splice.

For this purpose, a preamble is annexed to each data field at the time of writing. The preamble normally includes, for example, a synchronization field, an ID field, and a synch byte field. The synchronization field and synch byte field are used to lock the read channel to the amplitude, frequency, and start of upcoming data. The identifier field is used to uniquely identify a particular data splice and to provide information about defective zones within the splice. Some disk drives employ headerless or ID-less data block formats for enhanced data capacity, i.e., data blocks in which the preamble does not contain identification or "ID" information. See, for example, commonly owned U.S. Pat. No. 5,438,559 for a description of disk drives employing a "NOID" (TM) format. Finally, the preamble includes synch bytes for properly framing the data bytes.

A specific example of a NoID track format suitable for practicing the present invention is shown in FIG. 3B. It includes PAD field 82, VFO field 84, SYNC field 86, data field 88, ECC field 90, Viterbi closure field (CL) 92, FLUSH field 94 and second PAD field 96. As before, the times shown below each field represent the duration for which time each field remains beneath the transducer 8, assuming a rotational speed of 7200 RPM. In contrast to the servo sector field timings, these times are ranges of values because the timing of their corresponding fields will change from zone to zone. The lower numbers correspond to data blocks located at the outermost data zone, whereas the higher numbers correspond to blocks at the innermost data zone.

The PAD fields 82 and 96 provide a buffer region between each data field and its adjacent data fields, and also between each data field and an adjacent servo field. Their lengths must be sufficient to accommodate fluctuations in spindle speed. For a 7200 RPM drive, a six byte PAD field 62 and a three byte PAD field 96 have been found to be sufficient. The VFO field 84 includes a repeating pattern for producing an electrical signal having the same amplitude, frequency and phase as the user data to be read, enabling the read electronics to make the necessary amplitude and frequency adjustments to enable reading. Like the AGC field of the servo sector, the repeating signal is used by the AGC circuit to adjust the VGA, and by the VFO circuit to tune the VCO to match the frequency and phase of the signal. The VFO field must be sufficient to accommodate the amplitude adjustment and synchronizing operations, as well as transients occurring in a write to read switch. In the preferred embodiment, 29 bytes was found to be sufficient.

The VFO field 84 is followed by a SYNC field 86. This field includes a pattern or group of adjacent patterns, generally referred to as "sync bytes", that mark the beginning of the data field and provide a frame of reference for correctly distinguishing data bytes. Sync bytes are detected by sync byte detection logic in the data channel that looks for one or more predetermined sync byte patterns during a certain window of time. In the preferred embodiment, the SYNC field 86 contains six synchronization bytes.

The SYNC 86 field is immediately followed by a user data field 88. The length of the data field 88 is typically customer-specified, and the ECC field 90 length depends upon the size of the data field and the ECC coding scheme employed. For example, given a data field of 512 bytes, 32 bytes of ECC are sufficient. Of course, the data and ECC field lengths for split data blocks will be shorter. Viterbi closure field 92 is preferably two bytes in length and is required for proper closure if the data channel 20 includes a maximum likelihood Viterbi detector. Finally, the FLUSH field 94 is provided when using a data transducer having an offset between the read and write elements to allow for the time to switch from reading to writing or writing to reading.

Figure 4:
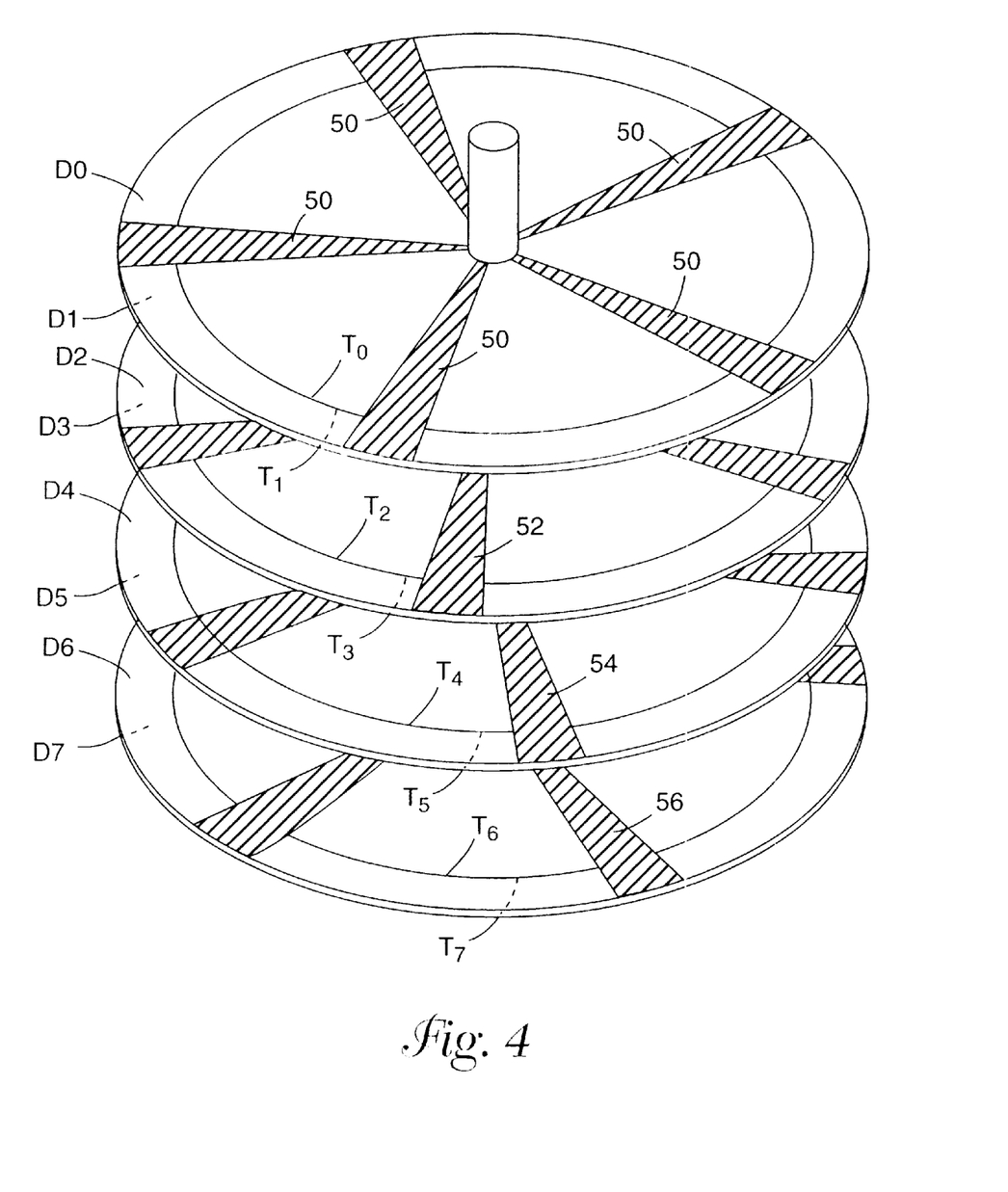
FIG. 4 represents skewed sectors in a disk stack.

It is a common practice to write data to data tracks on a cylinder by cylinder basis, rather than to consecutive tracks of a single data surface. Recall that a cylinder is a set of tracks of the respective data surfaces that are radially aligned. FIG. 4 is representative of a disk stack in a disk drive comprising four disks with eight data surfaces D0–D7. The illustration is provided as an example only, as the present invention is readily adaptable to storage devices having as few as a single data surface to as many as any feasible number of data surfaces. In FIG. 4, an exemplary cylinder is represented as radially aligned tracks T0–T7. The read/write heads (not shown) are preferably numbered H0–H7, corresponding to data surfaces D0–D7. When writing data to a cylinder, data is first written to T0 by selecting head H0, seeking to track T0, counting the servo SIDs 68 to locate a desired initial sector number, and then commencing writing. Upon completion of writing to track T0, head H1 is selected and track T1 is written, starting at the same initial sector number. This is followed by a switch to head H2, then head H3, and so on.

The disks of FIG. 4 include a plurality of servo sectors S0, S2, S4, S6 disposed on each of the visible data surfaces. Only five servo sectors are shown per surface for simplicity of illustration, but a sector servo disk format will typically includes many more for tighter track following. In the preferred embodiment, 90 sectors are provided per disk surface. The servo sectors shown are skewed rather than aligned with one another. This placement holds true for the nonvisible sectors S1, S3, S5 and S7 as well. The sectors are skewed so that upon completion of writing a track, there is enough time to switch heads and immediately resume writing on the next data surface at the desired sector number. Sector skewing thus avoids having to delay writing for one revolution of the disk and thereby improves drive performance.

Figure 5:
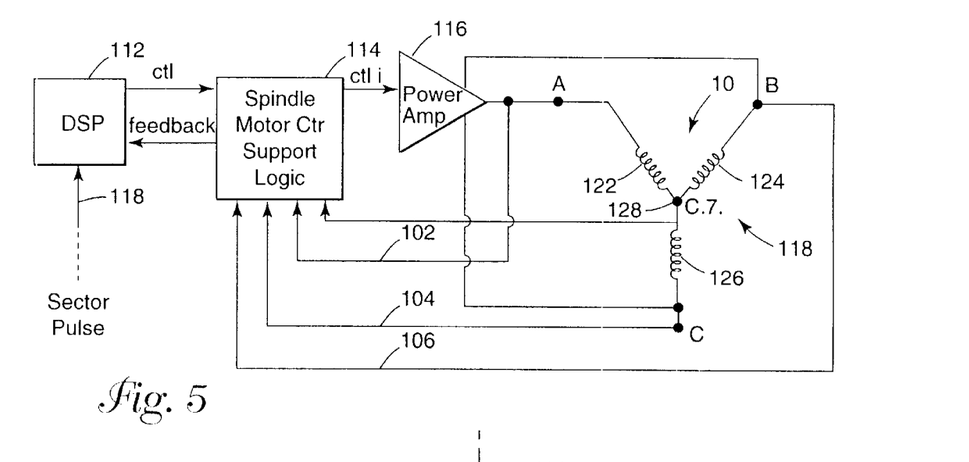
FIG. 5 is a functional block diagram representative of the spindle motor and spindle motor control electronics of a disk drive suitable for practicing the present invention.

The operation and control of a spindle motor will now be described with reference to FIGS. 5–8. Referring first to FIG. 5, a spindle motor control loop according to the preferred embodiment is shown. It includes a processor 112, spindle motor control support logic 114, a power amplifier 116, and the coils 122, 124, 126 of a brushless and sensorless DC spindle motor 10. (A spindle motor may have more coils.) As is well-known in the art, spindle motor 10 is rotated by switching commutation currents of carefully selected magnitude and direction to the respective coils of the motor in a specified order, as will be discussed in more detail momentarily. The motor coils 122, 124, 126 are joined at a center tap 128. Commutation currents are applied to the coils at nodes A, B and C by the power amplifier 16, which contains three transistors or other switches means, in response to switching control signals from the support logic 114. As the motor begins to rotate, a back-emf is generated about each coil indicative of rotation. The back-emf is provided to the support logic 114 as feedback in the form of pulses from each of the active coils via lines 102, 104 and 106. The back-emf pulses may be used at spin-up as indicators that the spindle motor is moving, eliminating the need for Hall sensors. Moreover, they may be used in the transition from spin-up to normal operating mode as indicators of motor switch points and to monitor rotational speed. For example, the support logic 114 may count the elapse of time between respective pulses and average this information over one or more revolutions. The support logic 114 then communicates this timing information to the processor 112, which in the preferred embodiment comprises a digital signal processor (DSP) embedded in the actuator and spindle motor control logic module 16 of FIG. 1. The DSP compares the timing information to reference timing information corresponding to a desired spindle motor RPM. If the system is still in spin-up mode, the DSP 112 uses this information to determine whether the motor has reached operating speed. If the desired RPM has been reached, the DSP 112 switches the system to normal operating mode, e.g. by sending a control signal to the support logic 114 instructing it to reduce current to the motor 10. On the other hand, if the system is already in normal operating mode, the DSP 112 uses the timing information to monitor motor speed. If the results of the comparison indicate that the motor is spinning too fast, the DSP 112 sends a control signal to the support logic 114 instructing it to decrease the motor current. Conversely, if the results indicate that the motor is spinning too slowly, the DSP 112 signals the support logic 114 to increase motor current. As an alternative to using back-emf during normal operation to monitor RPM, sector pulses read from the disk surfaces may be provided to the DSP 112 or support logic 114 from the channel 20. Motor speed may then be determined by counting the elapse of time between sector pulses (or taking a running average over one or more revolutions) and comparing this timing information to reference sector timing information corresponding to the desired RPM. Corrective signals may then be generated in response to the results of the comparison in the same manner as described for the back-emf approach.

Figure 6:
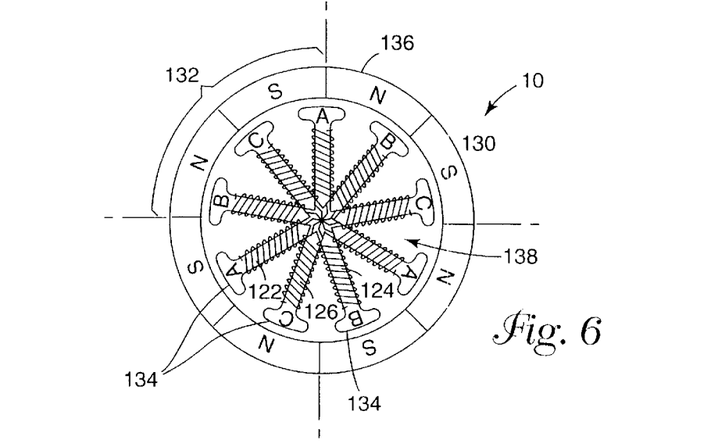
FIG. 6 represents a three-phase brushless DC spindle motor having eight poles and nine slots suitable for practicing the present invention.

FIG. 6 is a detailed drawing representative of a specific brushless DC spindle motor suitable for practicing the present invention. It comprises a magnetic rotor 136 having four north-south pole pairs 132, and a stationary stator 138 having nine slots 134. It shall be understood, however, that other motor configurations would also be equally suitable for implementing the present invention. Each of the nine slots 134 is wound with one of the motor coils 122, 124, 126, preferably such that every third slot 134 is wound with the same coil, as represented by the letters A–C. The slots are wound in such a way that coil nodes A, B, and C and center tap 128 all terminate at the stator's center 130 so that the wires can exit the motor through the center of its base.

When a current is applied to any one of the motor coils 122, 124, 126, the coil generates a magnetic flux which reacts with the adjacent magnetic poles to produce an attractive or repulsive force. The resulting torque causes the rotor to spin in some direction. The current can be applied to the coils in a specific sequence to assure that the generated torques will produce rotation in a single direction. Rotational speed is then controlled by adjusting the amplitudes of the driving currents.

Figure 7:
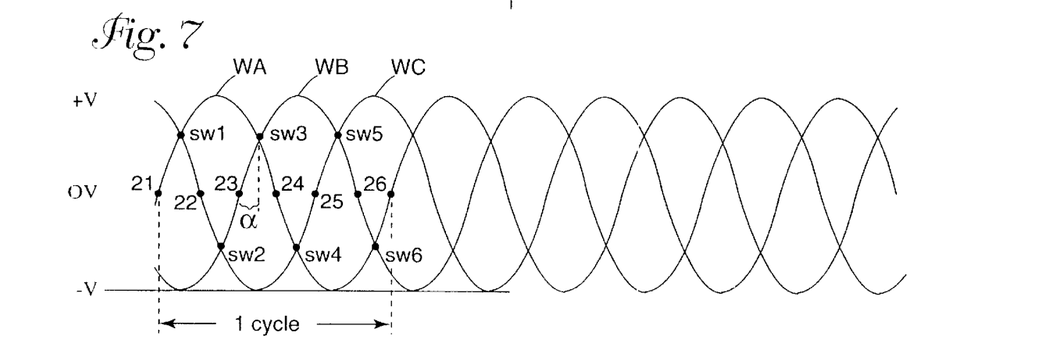
FIG. 7 represents the commutation voltages of the three windings of the spindle motor of FIGS. 4 and 5.

FIG. 7 illustrates the commutation voltages used to drive a spindle motor such as the one represented in FIGS. 5 and 6. Three sinusoidal waveforms, WA–WC, are shown, each having a maximum amplitude of +V and a minimum amplitude of −V. For a typical 3.5" disk drive, these voltages are generally around +/−5 volts supplied by a 12 volt power supply. Voltage waveform WA is applied at preselected times to node A to drive winding 122. Similarly, waveform WB drives winding 124 and waveform WC drives winding 126.

Exemplary commutation switch points, i.e., points at which power amplifier 116 switches from driving one winding to driving the next winding in sequence, are designated as SW1–SW6, there being six switch points within any single waveform cycle. In the commutation sequence of the preferred embodiment, voltage waveform WA is applied to node A for the duration defined by switch points SW1 and SW3. SW1 represents the point at which WA is switched "on", and at which waveform WC is switched "off". SW3 represents the point at which WA is switched off, and at which waveform WB is switched on. Switch points SW1 and SW3 are located to either side of the waveform's positive peak. They are also positioned according to known methods in a manner which optimizes motor efficiency. For optimal spindle motor performance, each switch point is displaced by 30 degrees from the last zero-crossing point of the switched waveform, designated by the symbol alpha in FIG. 7. For example, switch point SW1 is displaced from zero crossing point Z1 by 30 degrees, and similarly, switch point SW3 is displaced from zero crossing point Z3 by 30 degrees. This displacement is controlled by the digital signal processor 112 and a delay circuit (not shown) in the spindle motor control logic 114. The DSP 112 includes a control program to control spindle motor switching which defines a nominal switch point delay from zero—here, a delay corresponding to a 30 degree displacement. The DSP 112 communicates this delay to the delay circuit.

Continuing with the commutation sequence, waveform WC is switched "on" next for the duration defined by switch points SW2 and SW4. These switch points are located to either side of the waveform's negative peak, and are optimally placed 30 degrees from the last zero-crossing points Z2 and Z4, respectively. (The switch point SW2 also represents the point at which the negative voltage of waveform WB is switched off.) It should be noted that waveform WA is still turned on when waveform WC is first applied to node C. Next in sequence, waveform WA switches off at point SW3 and the positive voltage of waveform WB is applied to node B for the duration defined by SW3 and SW5. While waveform WB is still on, waveform WC switches off (point SW4) and the negative voltage of waveform WA is newly applied to node A. Next, waveform WB turns off at point SW5 and the positive voltage of waveform WC is turned on. At switch point SW6, waveform WA turns off, and the negative voltage of waveform WB is applied to node B. From this point forward, the commutation sequence is repeated.

Figure 8A:
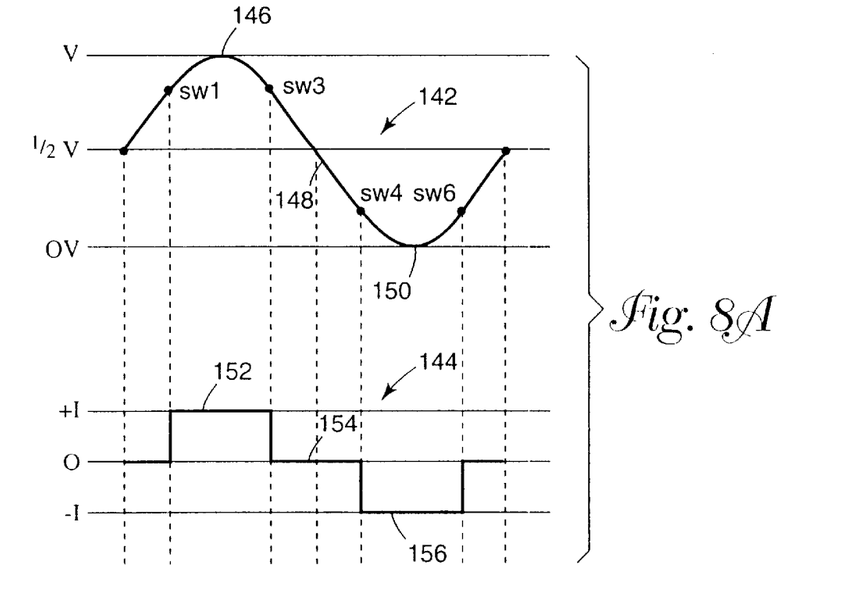
FIG. 8A represents a current profile provided by the spindle motor driving electronics corresponding to a single cycle of a spindle motor winding.

FIG. 8A illustrates the current profile 144 of the driving current in winding A of the motor corresponding to one cycle 142 of the WA commutation voltage waveform. There are four cycles per rotation of the motor shown in FIG. 6, one corresponding to each north-south pole pair 132. A positive current 152 is generated through coil A from the time that WA is switched on at switch point SW1 to the time that it is switched off at switch point SW3. Next, a negative current is generated through the coil, starting from the time that WA is switched on at switch point SW4 to the time that it is switched off at switch point SW6. The illustration is also representative of the currents passing through coils B and C in response to a single cycle of WB or WC.

The method of the present invention, as may be implemented in the described spindle motor system of FIGS. 5 and 6 to provide an apparatus according to the present invention, shall now be described. In its simplest form, the present invention is implemented by controlling current switching to assure that switch points always coincide with nondata regions of sufficient length to accommodate the switching time. In the sector formats of FIGS. 3A and 3B, the following fields would be suitable for accommodating a typical switching time of 1 micro seconds, in order of preference: the combination of pad field 62, W/R recovery field 64 and AGC field 66; the combination of pad field 82 and VFO field 84; and the combination of closure field 92, flush field 94, PAD field 96, and if needed, a portion of ECC field 90. Similarly, nondata fields of other track formats may be identified and if possible, will include a PAD field. As a specific example, the switching points in a sectored servo disk drive are scheduled to coincide with servo sectors. Coincidence between the servo fields and switching times is accomplished by servowriting each data surface with a plurality of servo sectors such that the servo sectors of respective disks are circumferentially aligned and such that each switching point corresponds in time to the passage of a servo sector beneath the active transducer. If N switching points are required to maintain a desired RPM for a fixed commutation voltage, the data surfaces will be written with a number of servo sectors which is some multiple of N. In a related embodiment, if limited by an existing track format, the nominal switching point delays are programmed to correspond with existing nondata regions, e.g., servo sectors, and the desired RPM is attained by modifying the magnitude and duration of the commutation voltage waveform. According to either approach, switching is virtually guaranteed to occur within a servo sector without the need for additional timing controls.

Figure 8B:
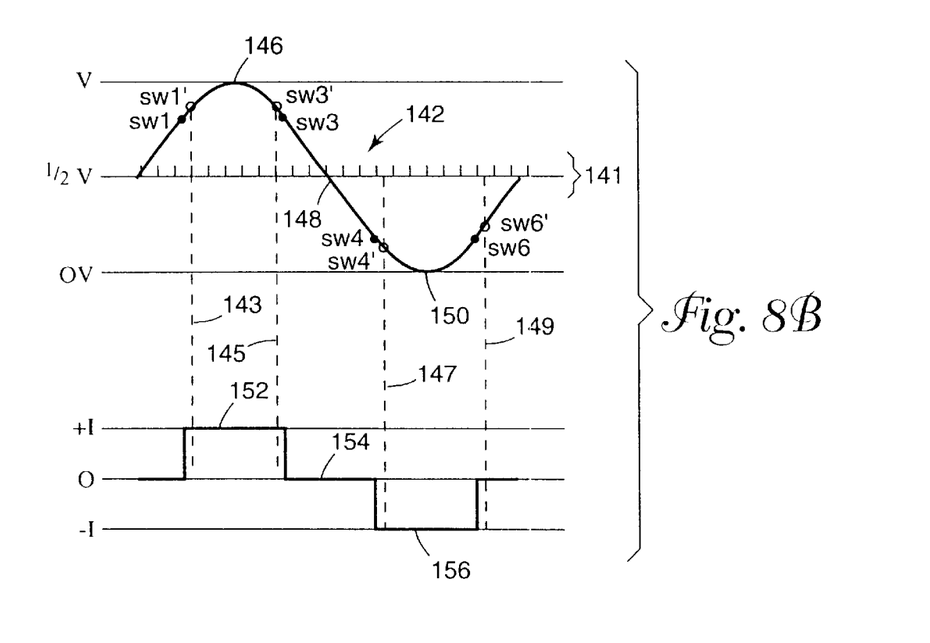
FIG. 8B represents the current profile of FIG. 8A as modified in accordance with the present invention.
Figure 9A:
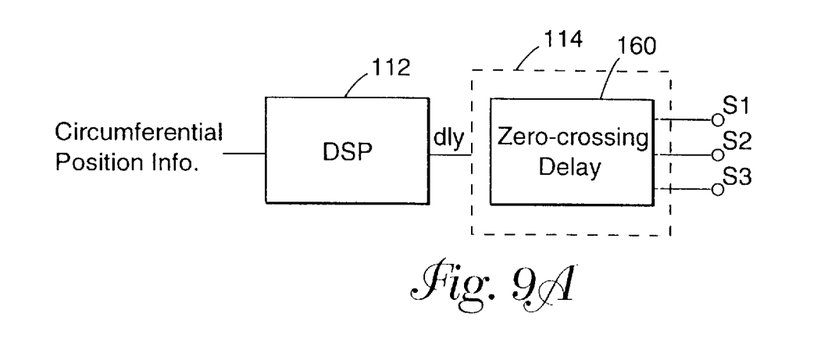
Figure 10:
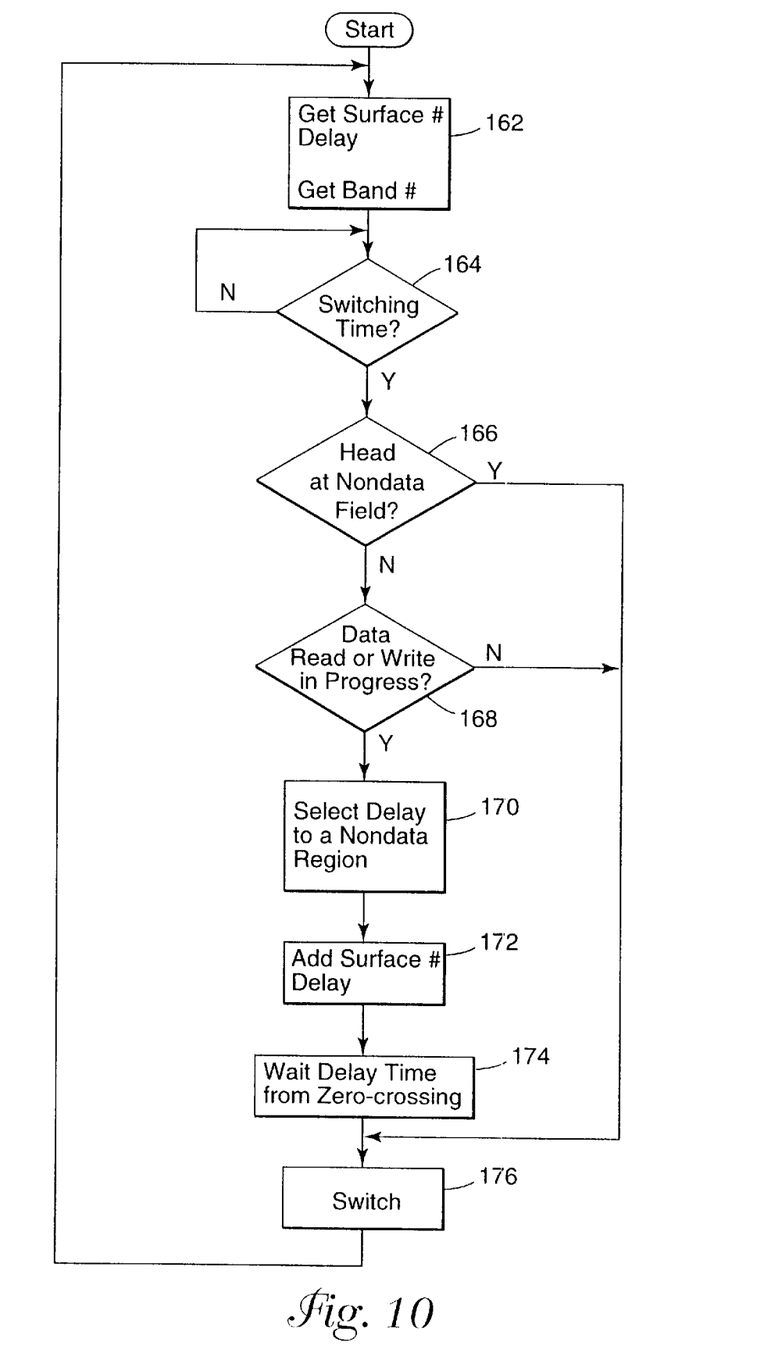
FIG. 10 is a flow diagram of the proposed method for commutating a spindle motor.

The remaining embodiments shall be described with reference to FIGS. 8B, 9 and 10. In these embodiments, it is proposed that the switching points are advanced or delayed to coincide with nondata regions of the disk by adding a timing control function to the spindle motor system. This timing control function is represented by FIG. 9A, and is implemented, for example, by the switching control program in DSP 112, which is preprogrammed with a nominal switching delay from a zero-crossing point, and the timing delay circuit 160 in the support logic 114 which applies the delay from a zero crossing point to the switching control signals S1, S2, and S3. Prior to each switching point, the DSP dynamically increases or decreases the nominal delay to a determined amount so that the switching point is either advanced or delayed to coincide with a nondata region on the disk.

Figure 9B:
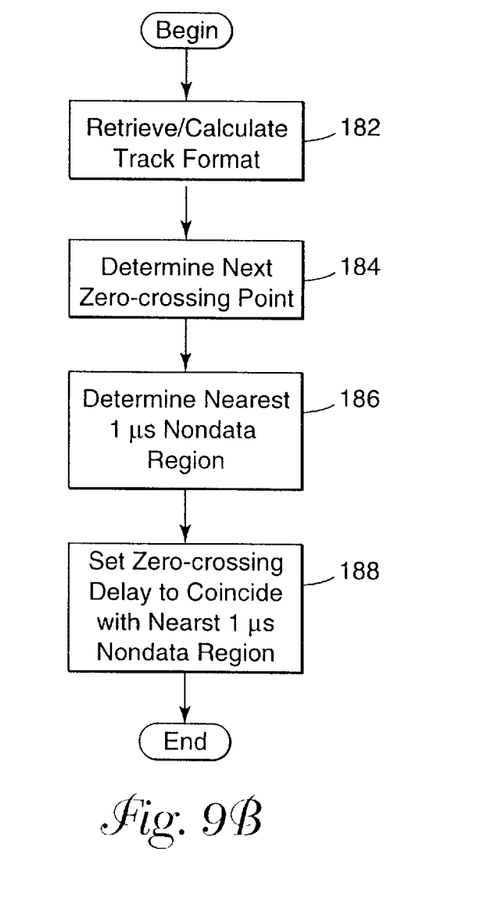
FIG. 9B is a flow diagram to determine an appropriate delay.

The process of determining an appropriate delay is illustrated in the flow diagram of FIG. 9B. First, the DSP 112 retrieves a map of the track, cylinder or band format which has been created and stored in memory (accessed by track, cylinder or band number) and identifies the nondata regions of the current track (step 182). Alternatively, the track, cylinder or band format may be represented by an algorithm and calculated accordingly. Next, the DSP 112 determines the point on the track corresponding to the next zero-crossing point (step 184). For example, the correspondence between the nominal switching points and the track may be included in the mapped information or as part of the track format algorithm. It may also be tracked using feedback information from the spindle motor indicative of the last switching point compared with feedback information from the transducer such as SID and/or index pulses indicative of the current head position relative to the track. The DSP 112 then identifies the nondata region on the track nearest to the nominal switching point track location (step 186), again from the map or algorithm. The nondata region may be prior to or after the track position corresponding to the nominal switching point, and must be of a sufficient length to accommodate the switching time (e.g., 1 microsecond). In the final step 188, the DSP 112 resets the nominal zero crossing delay to a new delay that will advance or delay switching to coincide with the identified nondata field. As an alternative to this approach, the zero-crossing delays corresponding to nondata regions may all be determined in advance, rather than dynamically, and hardcoded into the control program or stored in memory. In addition to these proposed implementations, numerous other methods for delaying switch points should become apparent to a person familiar with spindle motor control.

As a specific example of the proposed method, it may be desirable in a disk drive with a sector servo architecture to restrict switching to the servo sectors. This approach works very well, since there usually enough servo sectors on the track to guarantee that there will always be a servo sector near a nominal switching point, thus reducing an adverse impact on spindle motor performance. According to this implementation, each data surface preferably has about ninety-two servo sectors, each with an angular separation of approximately four degrees. This number translates into twenty-three sectors per commutation voltage waveform cycle for the spindle motor of FIG. 7, there being four waveform cycles per rotation. Since the nominal switching point may be either advancement or delayed to the nearest servo sector, the maximum displacement of the switch point will be ½ * 1/23 or 1/46 of a cycle period. Dashed lines 143, 145, 147 and 149 in FIG. 8B illustrate switch point delays to a nearest one of the servo sectors (represented by the divisions 141) causing a corresponding timeshift of the current generated in coil A. Note that SW1', SW4' and SW6' have been delayed from the nominal switch points SW1, SW4 and SW6, whereas SW3' has been advanced from nominal switch point SW3.

Selection of an appropriate zero-crossing delay time according to this approach can be performed without the use of a memory map. DSP 112 can track the locations of the SIDS by maintaining a count between SID pulses. When a switching point is approaching, the location of the next zero-crossing point may be determined from the spindle motor feedback information compared to the circumferential position information. The new zero-crossing delay is then determined by taking the difference between the time to the next SID and the time to the next zero-crossing point. This difference delay is then passed on to the switch point delay circuit 160 in the support logic and switching is delayed until the next servo sector is expected beneath the transducer.

A similar approach can be applied to use non-servo nondata fields, or for better spindle motor performance, a combination of servo sectors and other nondata fields of sufficient length. The locations of all of the nondata regions of interest, or of all of the non-servo nondata regions, may be mapped or defined by an appropriate algorithm. Prior to each switching time, the DSP 112 will identify the nearest nondata region to the appropriate zero crossing point from the map/algorithm, or from the map/algorithm and the SID period count. It will then select an appropriate delay to advance or delay the switch point so that it coincides with the identified nondata region.

A number of optional enhancements to the basic procedure are possible. FIG. 10 shows an expanded version of the program sequence for adjusting the nominal switch point zero-crossing delays. First, a determination is made of whether a switching point is approaching (step 164). If so, then the nominal switch point delay is modified according to the steps of FIG. 9B, as represented by block 170 in FIG. 10. In the final steps, switching is delayed for the determined time (steps 174 and 176). For banded data or other formats in which the track compositions differ across the disk, each unique track format is mapped in memory. The current track or band number is then determined in step 162, and the appropriate track format is retrieved from memory.

According to a first proposed enhancement, changes to the switch point are avoided in instances when the nondata regions will occasionally coincide with switching points. A decision box (step 166) is added prior to step 170 to determine whether the head will be over a nondata field of sufficient length when switching is imminent. This is accomplished, for example, by mapping the locations of all nondata fields and nominal switching points around a track, flagging those switch points which coincide with nondata regions of sufficient length. It may also be accomplished by determining the next switching point from the map, feedback from the spindle motor, and circumferential information from the disk, and then determining whether the switch point corresponds to a nondata region on the map. If it is determined that the transducer will indeed coincide with a nondata region, then the DSP 112 may avoid the selecting and delaying steps, e.g., by providing the nominal delay to the delay circuit 160. As an alternative, or for additional verification, a check is made to verify that the transducer is detecting the expected nondata field before switching is allowed to take place.

Another modification to the basic method is to provide a decision box (step 168) for determining whether or not a data transfer operation is in progress when a switching point is approaching. If not, a switching delay is not necessary because the noise from the switch will not interfere with data storage or retrieval. Under these circumstances, switching is allowed to occur normally, e.g., by the DSP 112 providing a nominal delay to the delay circuit 160.

As still another enhancement, the method is adapted for sector skewing. For multiple-disk disk drives employing sector skewing, the servo sectors and data sectors of adjacent data surfaces will not be aligned circumferentially. In this instance, the timing control functions are modified to provide an additional delay to account for sector skewing when switching from one transducer to another. Delay times corresponding to the offsets of each data surface relative to a reference data surface may be determined in advance and stored in memory, e.g. at manufacturing time or during a calibration or recalibration routine. Then in step 162, the current surface number is determined and its corresponding skew delay selected from memory. Once the delay to the next nondata region has been determined in step 170, the skew delay is added to that number in step 172.

While the present invention has been described with reference to particular embodiments, it shall be understood that these embodiments are not intended to limit the scope of the invention as claimed below. Moreover, numerous modifications will become apparent to the skilled artisan in view of the teachings of the present specification without departing from the spirit and scope of the claimed invention.

We claim:

1. A method for controlling a spindle motor having at least one winding in a storage device comprising a data storage medium rotatably supported by the spindle motor and having a plurality of tracks on each data storage surface thereof including data regions and nondata regions, a transducer assembly for selectively positioning a transducer over a desired track of each data storage surface for reading and writing of information stored on the medium, rotation of the motor being controlled by a spindle motor control system which provides a voltage waveform to each winding at selected commutation switching times, comprising the steps of:

prior to the transducer being positioned over a nondata region on a current track of the data storage surface determining a selected commutation switching time; and advancing or delaying the selected commutation switching time so that the commutation switching time occurs within the nondata region on a current track of the data storage surface and the transducer is positioned over the nondata region on a current track of the data storage surface.

2. The method of claim 1, further comprising the steps of,
prior to the advancing or delaying, determining if a read or write operation is in progress, and
if not, then skipping the advancing or delaying step for that switching time.

3. The method of claim 1, further comprising the steps of,
prior to the advancing or delaying, determining if the transducer will be over a nondata region during the selected switching time, and
if so, then skipping the advancing or delaying step for that switching time.

4. The method of claim 1, wherein each selected switching time is displaced by a nominal time delay from a reference point of the voltage waveform defined for that switching point.

5. The method of claim 4, wherein the advancing or delaying step further comprises the step of displacing the selected switching time by a modified time delay from the reference point of the voltage waveform defined for that switching point.

6. The method of claim 1, wherein the storage device further comprises a plurality of data storage mediums, each having a data storage surface with a same surface format, and wherein the nondata regions on each data storage surface are offset in time from the nondata regions of each of the other data storage surfaces.

7. The method of claim 6, wherein the current track is disposed on a first of the data storage surfaces, and wherein the advancing or delaying step further comprises the steps of,
selecting a reference surface,
determining an offset in time between the nondata regions of the first data storage surface and the nondata regions of the reference surface, and
using the determined offset in time to determine the amount by which to advance or delay switching.

8. The method of claim 7, wherein the step of determining an offset in time between the first and reference surfaces further comprises the steps of,
for each data storage surface, determining an offset in time between the surface and the reference surface, and storing the determined time offset.

9. The method of claim 8, wherein offsets in time are determined when the storage device is being manufactured.

10. The method of claim 8, wherein the offsets in time are determined by a calibration routine during operation of the storage device.

11. The method of claim 1, wherein at least some of the nondata regions further comprise servo sectors, and wherein the advancing or delaying step further comprises advancing or delaying the selected switching time until the transducer is positioned over one of the servo sectors on the current track.

12. The method of claim 11, wherein at least some of the data regions are split by ones of the servo sectors.

13. The method of claim 1, wherein some of the plurality of tracks of each data storage surface have a different recording frequency than others of said tracks.

14. The method of claim 1, wherein the spindle motor further comprises a three-phase brushless D.C. spindle motor.

15. The method of claim 1, further comprising the step of mapping the locations of at least some of the nondata regions in memory, and advancing or delaying the switching point to a nondata region using the mapped nondata region locations.

16. A method for controlling a spindle motor in a storage device comprising at least one data storage medium rotatably supported by the spindle motor and having a plurality of tracks including data regions and nondata regions, a transducer assembly for selectively positioning a transducer over a desired track of each data storage surface for reading and writing of information stored on the medium, and wherein the spindle motor has at least one winding, rotation of the motor being controlled by providing a voltage waveform to each winding at selected commutation switching times, the method comprising the steps of:

mapping the format of data storage surface to identify nondata regions thereon;

selecting the commutation switching times such that each commutation switching time occurs within one of the mapped nondata regions of each data storage surface of the storage medium.

17. The method of claim 16, wherein at least some of the nondata regions further comprise servo sectors, and wherein each switching time is selected to correspond in time to one of the servo sectors.

18. The method of claim 16, wherein some of the plurality of tracks of each data storage surface have a different recording frequency than others of said tracks.

19. The method of claim 16, wherein the spindle motor further comprises a three-phase brushless D.C. spindle motor.

20. A method for formatting a data storage surface of a data storage medium in a storage device, the storage device including a data storage medium rotatably supported by a spindle motor having at least one winding, rotation of the spindle motor being controlled by a spindle motor control system for providing a voltage waveform to each winding at selected commutation switching times during each rotation, and a transducer assembly for selectively positioning a transducer over a desired track of each data storage surface for reading and writing of information stored on the medium, the method comprising the step of:

servowriting each data storage surface of the storage medium so that each selected commutation switching time occurs within a servo sector.

21. The method of claim 20, wherein some of the plurality of tracks of each data storage surface have a different recording frequency than others of said tracks.

22. The method of claim 20, wherein the spindle motor further comprises a three-phase brushless D.C. spindle motor.

23. Apparatus for controlling a spindle motor having at least one winding in a storage device comprising at least one data storage medium rotatably supported by the spindle motor and having a plurality of tracks on each data storage surface thereof including data regions and nondata regions, a transducer assembly for selectively positioning a transducer over a desired track of each data storage surface for reading and writing of information stored on the medium, rotation of the motor being controlled by a spindle motor control system for providing a voltage waveform to each winding at selected commutation switching times, the apparatus comprising:

a processing circuit for determining a selected commutation switching time prior to the transducer being positioned over a nondata region on a current track of the data storage surface; and for determining an amount of time by which to advance or delay a selected commutation switching time so that the commutation switching time occurs within the nondata region on a current track of the data storage surface and the transducer is positioned over the nondata region on a current track of the data storage surface, a delay circuit coupled to the processing circuit to advance or delay the selected commutation switching time by the determined amount.

24. The apparatus of claim 23, wherein prior to determining the amount, the processing circuit determines if a read or write operation is in progress, and wherein if a read or write operation is not in progress, then the selected switching time is not advanced or delayed.

25. The apparatus of claim 23, wherein prior to the advancing or delaying step, the processing circuit determines if the transducer will be positioned over a nondata region during the selected switching time, and wherein if the transducer will be over a nondata region, then the selected switching time is not advanced or delayed.

26. The apparatus of claim 23, wherein each selected switching time is displaced by a nominal time delay from a reference point of the voltage waveform defined for that switching point.

27. The apparatus of claim 26, wherein the processing circuit determines the amount by determining a modified time delay for displacing the selected switching time from the reference point of the voltage waveform defined for that switching point such that the transducer is positioned over a nondata region of the current track during switching.

28. The apparatus of claim 27, wherein the storage device further comprises a plurality of data storage mediums, the data storage surfaces of each having a same surface format, and wherein the nondata regions on each data storage surface are offset in time from the nondata regions of each of the other data storage surfaces.

29. The apparatus of claim 23, wherein the current track is disposed on a first of the data storage surfaces, further comprising a second or the same processing circuit to select a reference surface, and to determine an offset in time between the nondata regions of the first surface and the nondata regions of the reference surface, wherein the processing circuit uses the determined offset in time to determine the amount in time to advance or delay the selected switching time.

30. The apparatus of claim 29, wherein the processing circuit has an associated memory, and wherein an offset in time between each data storage surface and the reference surface is stored in the memory.

31. The apparatus of claim 30, wherein offsets in time are determined when the storage device is being manufactured.

32. The apparatus of claim 30, wherein the offsets in time are determined by a calibration routine during operation of the storage device.

33. The apparatus of claim 23, wherein at least some of the nondata regions further comprise servo sectors, and wherein the processing circuit determines an amount by which to advance or delay the switching point so that switching occurs when the transducer is positioned over one of the servo sectors on the current track.

34. The apparatus of claim 33, wherein at least some of the data regions are split by ones of the servo sectors.

35. The apparatus of claim 23, wherein some of the plurality of tracks of each data storage surface have a different recording frequency than others of said tracks.

36. The apparatus of claim 23, wherein the spindle motor further comprises a three-phase brushless D.C. spindle motor.

37. The apparatus of claim 23, wherein the processing circuit has an associated memory, wherein the locations of at least some of the nondata regions are mapped in the memory, and wherein the processing circuit determines an amount to advance or delay switching by using the mapped locations.

38. Apparatus for controlling a spindle motor in a storage device comprising at least one data storage medium rotatably supported by the spindle motor and having a plurality of tracks including data regions and nondata regions, a transducer assembly for selectively positioning a transducer over each data storage surface of the storage medium for reading and writing of information stored on the medium, and wherein the spindle motor has at least one winding, rotation of the motor being controlled by providing a voltage waveform to each winding at selected commutation switching times during each rotation, comprising:

means for mapping the format of data storage surface to identify nondata regions thereon and selecting the commutation switching times such that the commutation switching times occur within the mapped nondata regions of the data storage surfaces; and a switching circuit for switching the voltage waveforms to the windings in accordance with the selected commutation switching times.

39. The apparatus of claim 38, wherein at least some of the nondata regions further comprise servo sectors, and wherein each switching time is selected to correspond in time to one of the servo sectors.

40. The apparatus of claim 38, wherein some of the plurality of tracks of each data storage surface have a different recording frequency than others of said tracks.

41. The apparatus of claim 38, wherein the spindle motor further comprises a three-phase brushless D.C. spindle motor.

42. An apparatus for formatting a data storage surface of a data storage medium in a data storage device, the data storage device including a data storage medium rotatably supported by a spindle motor having at least one winding, rotation of the spindle motor being controlled by a spindle motor control system for providing a voltage waveform to each winding at selected commutation switching times during each rotation, and a transducer assembly for selectively positioning a transducer over each data storage surface of the rotating storage medium for reading and writing of information stored on the medium, the apparatus comprising:

processing circuit to determine commutation switching time information based on the position of the spindle motor and circumferential position information from a data storage surface prior to the transducer being positioned over a servo sector on the data storage surface, and to select a commutation switching times to occur within the servo sector on the data storage surface; and a servowriter coupled to the processing means to write servo sectors to the data storage surface such that each selected commutation switching time occurs within a servo sector.

43. The apparatus of claim 42, wherein some of the plurality of tracks of each data storage surface have a different recording frequency than others of said tracks.

44. The apparatus of claim 42, wherein the spindle motor further comprises a three-phase brushless D.C. spindle motor.

45. A disk drive, comprising:

a spindle motor having at least one winding;

at least one data storage medium rotatably supported by the spindle motor and having a plurality of tracks on each data storage surface thereof including data regions and nondata regions;

a transducer assembly for selectively positioning a transducer over a desired track of each data storage surface of the storage medium for reading and writing of information stored on the medium; and wherein the spindle motor has at least one winding;

apparatus for controlling rotation of the spindle motor by providing a voltage waveform to each winding at selected commutation switching times during each rotation, comprising, a processing circuit for determining a selected commutation switching time prior to the transducer being positioned over a nondata region on a current track of the data storage surface; and for determining an amount of time by which to advance or delay a selected commutation switching time so that the commutation switching time occurs within the nondata region on a current track of the data storage surface and the transducer is positioned over the nondata region on a current track of the data storage surface, a delay circuit coupled to the processing circuit to advance or delay the selected commutation switching time by the determined amount.

46. The disk drive of claim 45, wherein prior to determining an amount, the processing circuit determines if a read or write operation is in progress, and if a read or write operation is not in progress, the switching time is not advanced or delayed.

47. The disk drive of claim 45, wherein prior to determining an amount, the processing circuit determines if the transducer will be positioned over a nondata region during the selected switching time, and if the transducer will be over a nondata region, the switching time is not advanced or delayed.

48. The disk drive of claim 47, wherein each selected switching time is displaced by a nominal time delay from a reference point of the voltage waveform defined for that switching point.

49. The disk drive of claim 48, wherein the processing circuit determines the amount by determining a modified time delay for displacing the selected switching time from the reference point of the voltage waveform defined for that switching point such that the transducer is positioned over a nondata region of the current track during switching.

50. The disk drive of claim 45, wherein the storage device further comprises a plurality of data storage mediums, each having a same surface format, and wherein the nondata regions on each surface are offset in time from the nondata regions of each of the other surfaces.

51. The disk drive of claim 50, wherein the current track is disposed on a first of the data storage surfaces, further comprising a second or the same processing circuit to select a reference surface, and to determine an offset in time between the nondata regions of the first surface and the nondata regions of the reference surface, wherein the processing circuit uses the determined offset in time to determine the amount to advance or delay the selected switching time.

52. The disk drive of claim 51, wherein the processing circuit has an associated memory, and wherein an offset in time between each surface and the reference surface is stored in the memory.

53. The disk drive of claim 52, wherein offsets in time are determined when the storage device is being manufactured.

54. The disk drive of claim 52, wherein the offsets in time are determined by a calibration routine during operation of the storage device.

55. The disk drive of claim 45, wherein at least some of the nondata regions further comprise servo sectors, and wherein the processing circuit selects an amount of time to advance or delay the selected switching time such that the transducer is positioned over one of the servo sectors on the current track during switching.

56. The disk drive of claim 55, wherein at least some of the data regions are split by ones of the servo sectors.

57. The disk drive of claim 45, wherein some of the plurality of tracks of each data storage surface have a different recording frequency than others of said tracks.

58. The disk drive of claim 45, wherein the spindle motor further comprises a three-phase brushless D.C. spindle motor.

59. The disk drive of claim 45, wherein the processing circuit has an associated memory, wherein the locations of at least some of the nondata regions are mapped and stored in the memory, and wherein the processing circuit determines an amount by which to advance or delay switching using the mapped locations.

* * * * *

UNITED STATES PATENT AND TRADEMARK OFFICE
CERTIFICATE OF CORRECTION

PATENT NO. : 6,067,202
DATED : May 23, 2000
INVENTOR(S) : Rowan et al.

It is certified that error appears in the above-identified patent and that said Letters Patent is hereby corrected as shown below:

Column 3,
Line 23, replace "Fig. 9" with -- Fig. 9A --;
Line 39, make a new paragraph after "scheme."

Column 5,
Line 27, delete "is";

Column 6,
Line 29, replace "NOID" with -- NoID --;

Column 7,
Line 42, replace "includes" with -- include --;

Column 11,
Line 31, replace "advancement" with -- advanced --;
Line 21, add -- are -- after "usually";

Column 16,
Line 66, replace "times" with -- time --;

Signed and Sealed this

Twenty-fifth Day of June, 2002

Attest:

Attesting Officer

JAMES E. ROGAN
Director of the United States Patent and Trademark Office